April 16, 1940.  A. S. T. LAGAARD  2,197,749
METHOD OF AND DEVICE FOR INSTALLING WALLBOARD
Filed Oct. 27, 1937  4 Sheets-Sheet 1
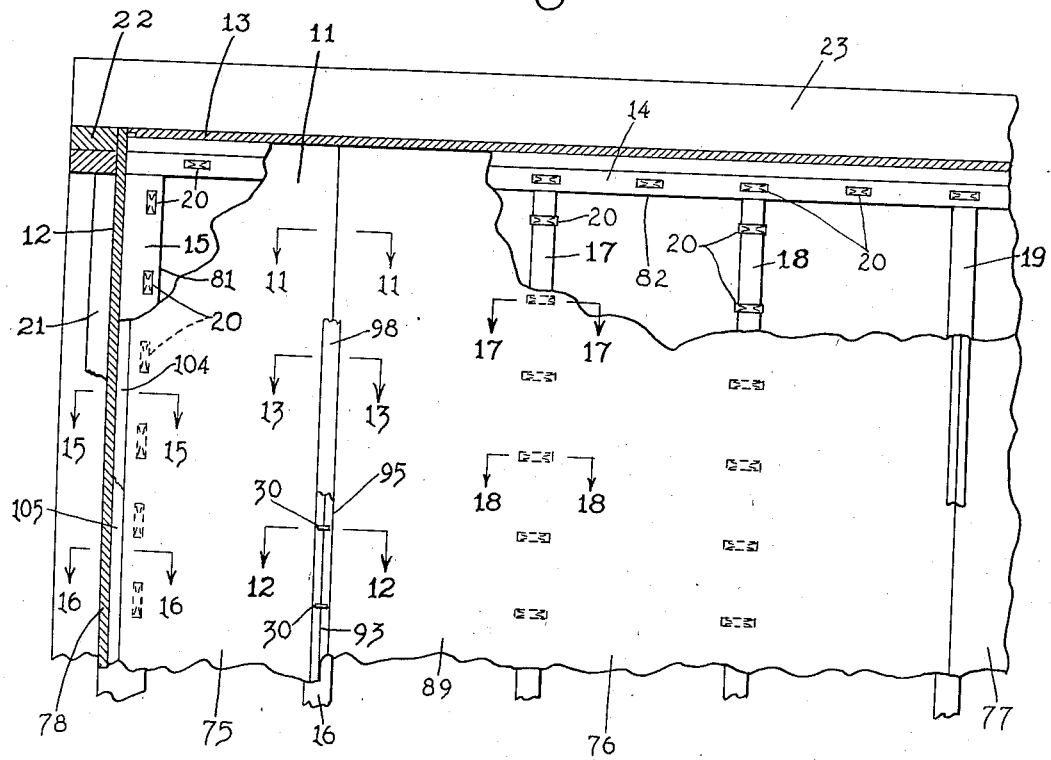
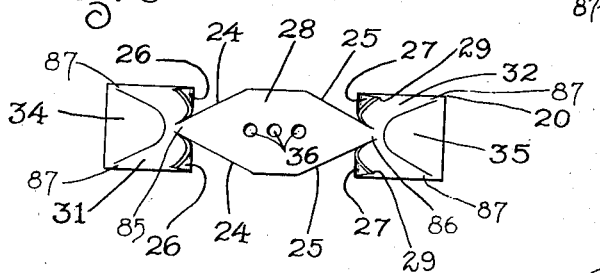
Inventor
Alexander S. T. Lagaard April 16, 1940.                A. S. T. LAGAARD                2,197,749
              METHOD OF AND DEVICE FOR INSTALLING WALLBOARD
                       Filed Oct. 27, 1937            4 Sheets-Sheet 2

Inventor
Alexander S. T. Lagaard

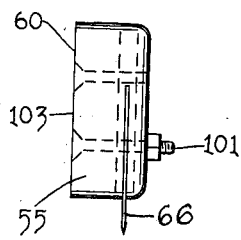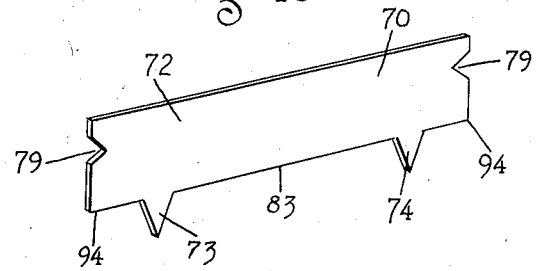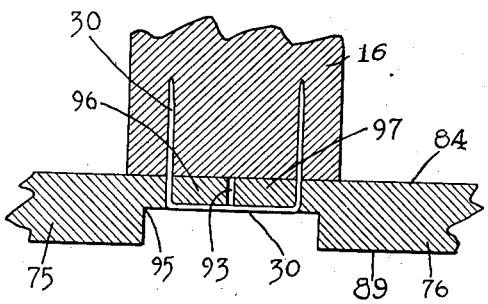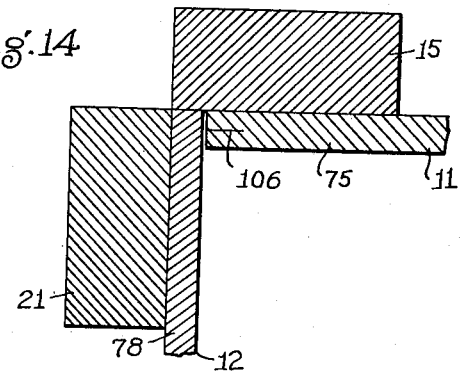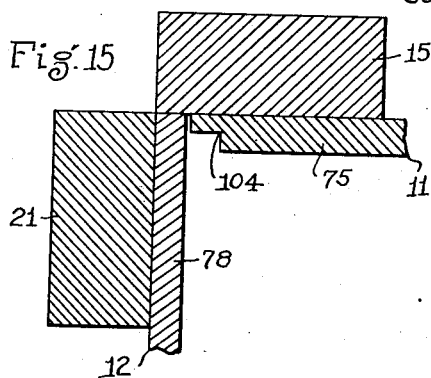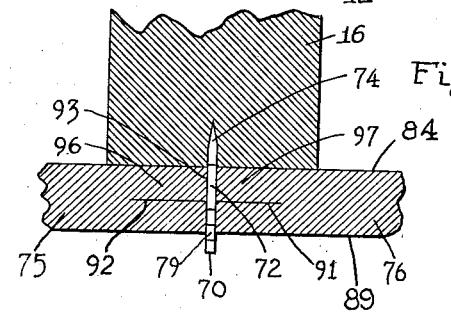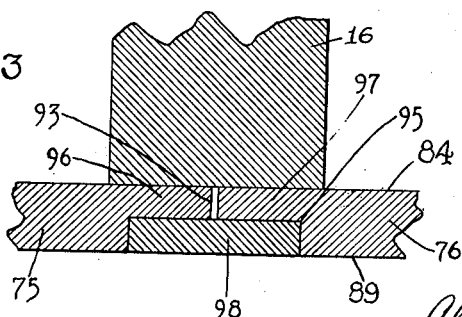

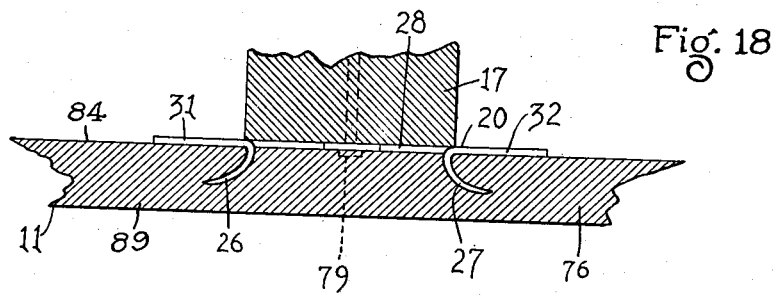
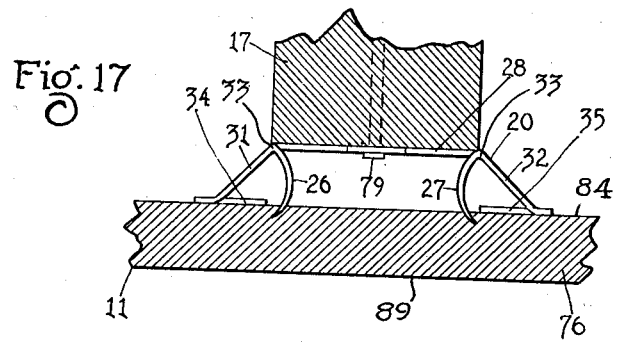
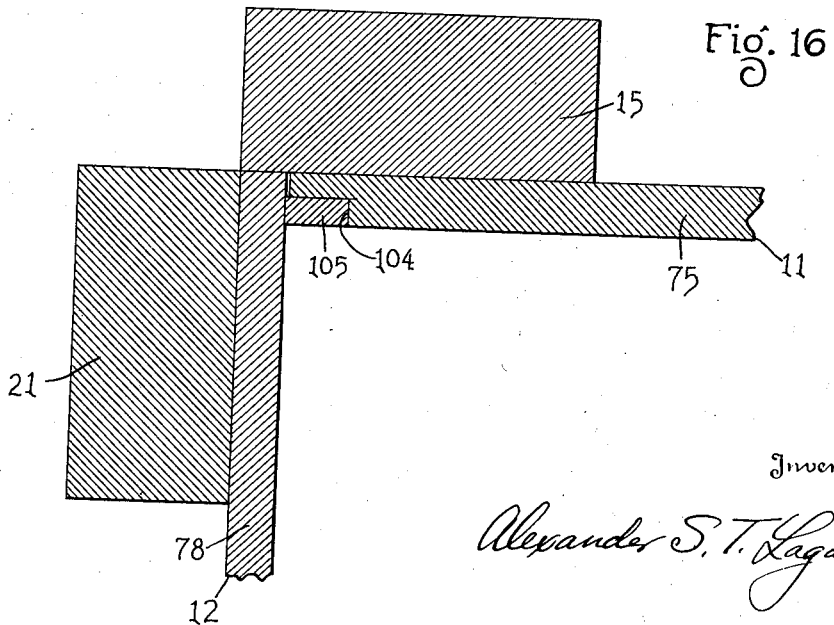

Patented Apr. 16, 1940

2,197,749

UNITED STATES PATENT OFFICE 2,197,749

METHOD OF AND DEVICE FOR INSTALLING WALLBOARD

Alexander S. T. Lagaard, Minneapolis, Minn.

Application October 27, 1937, Serial No. 171,209

9 Claims. (Cl. 72—118)

My invention relates to methods of and devices for installing wallboard and has for an object to provide a method and devices for installing the wallboard whereby no metal protrudes thru the wallboard.

Another object of the invention resides in providing a method of and devices for installing wallboard whereby invisible joints are procured between the sections of wallboard.

A still further object resides in providing a joint constructed from the same material as the wallboard.

Another object of the invention resides in providing a joint by means of which irregularities of the cutting of the wallboard are obscured.

A feature of the invention resides in providing a joint in which a groove of uniform width is formed in the adjoining sections of the wallboard after erection of the wallboard and in which a preformed filler strip of corresponding width is secured.

Another object of the invention resides in erecting the adjacent wallboard sections with a slot therebetween and in guiding a tool for forming the groove thru said slot.

An object of the invention resides in the method of forming the groove in the wallboard which consists in first slitting the marginal portions of the board before erection and in simultaneously cutting out the marginal portions of the board after erection.

An object of the invention resides in providing a fastener which may be secured to the supporting structure of the wallboard and which becomes attached to the wallboard solely from the back thereof.

A still further object of the invention resides in providing tools by means of which the joints can be made.

A feature of the invention resides in providing a spacer for forming the guide slot at the joint.

Other objects of the invention reside in the combination of parts and in the details of construction hereinafter illustrated and as described.

In the drawings:

Fig. 1 is an elevational view of a portion of the walls and ceiling of a room constructed in accordance with my invention.

Fig. 2 is a perspective view of one of the fasteners used with the invention.

Fig. 3 is a plan view of the fastener shown in Fig. 2.

Fig. 9 is an end elevational view of the corner grooving tool of the invention.

Fig. 10 is a perspective view of one spacer.

Fig. 11 is a cross sectional view of two adjoining sections of wallboard and the adjacent stud illustrating the method of using the spacer and taken on line 11—11 of Fig. 1.

Fig. 12 is a cross sectional detail view taken on line 12—12 of Fig. 1.

Fig. 13 is a detail cross sectional view taken on line 13—13 of Fig. 1.

Fig. 14 is a view similar to Fig. 11 showing the construction at the corner of the room.

Fig. 15 is a view similar to Fig. 12 of the structure shown in Fig. 14 and taken on line 15—15 of Fig. 1.

Fig. 16 is a view similar to Fig. 13 of the structure shown in Fig. 14 and taken on line 16—16 of Fig. 1.

Fig. 17 is a cross sectional detail view taken on line 17—17 of Fig. 1 showing the position of the fastener before erection of the wallboard.

Fig. 18 is a cross sectional detail view taken on line 18—18 of Fig. 1 and showing the position of the fastener after erection of the wallboard.

Figure 4:
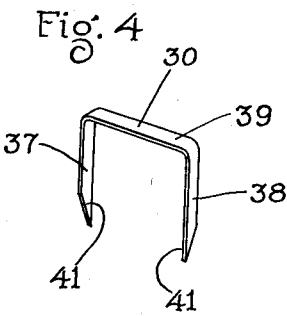
Fig. 4 is a perspective view of one of the staples used with the invention.

In the installation of wallboard and particularly insulating types of wallboard constructed from fibrous material great difficulty has been encountered. Where nails have been used it requires considerable time to putty up the nail holes and spots result which have a different surface texture than the wallboard itself. Such spots are hence always visible whether the wall is painted or papered. Furthermore when condensation collects on the nails the same rust and the rust shows through the puttied spots, discoloring the paper or the paint. In addition to the above difficulties it has been impossible to construct a secure joint which would have the same appearance as the wallboard itself. Where putty has been used to fill up the joints the putty soon cracks and the cracks are visible through the paint or paper. Where strips of thin material have been adhered to the wallboard at the joint the strips either are highly noticeable or where metal strips are used the same readily come off after a short period of time. The present invention overcomes all of these difficulties by providing a method of erection and special tools and devices whereby the wallboard may be installed without any nails or fastener members projecting through the exposed surface of the wallboard, and without the joints being visible or differing in character from the wallboard itself.

For the purpose of illustrating my invention I have shown in Fig. 1 a portion of a room of a building which comprises a wall 11, a second wall 12 intersecting the first wall and a ceiling 13 connected with both of the walls. The wall 11 includes a plate 14 which has attached to it a corner stud 15 and intermediate studs 16, 17, 18 and 19. Only the end view of the wall 12 is shown, which includes a corner stud 21 and a plate 22. The ceiling 13 comprises a number of ceiling joists 23 which rest upon the plate 22 and the plate of the opposite wall of the room which is not shown.

Figure 5:
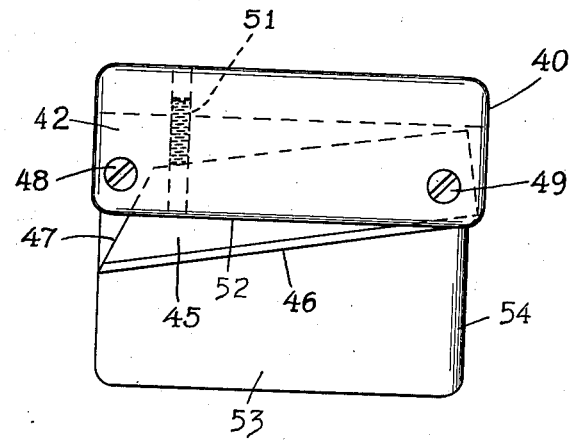
Fig. 5 is a side elevational view of the slitting tool of the invention.
Figure 6:
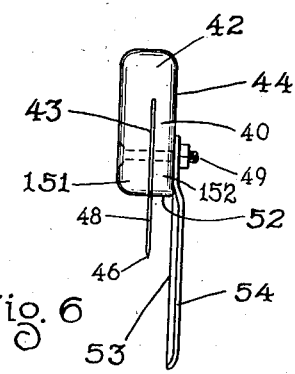
Fig. 6 is an end elevational view of the structure shown in Fig. 5.
Figure 7:
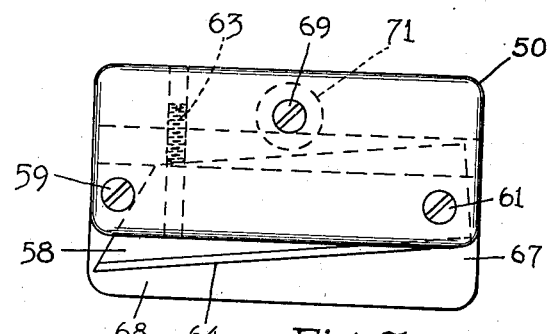
Fig. 7 is a side elevational view of the joint grooving tool of the invention.
Figure 8:
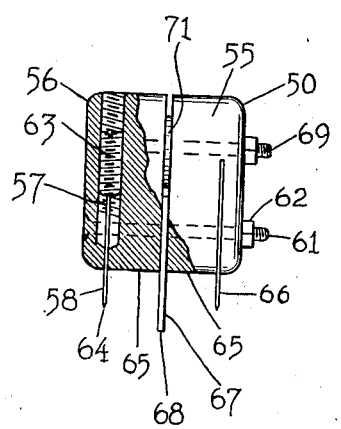
Fig. 8 is an end elevational view of the structure shown in Fig. 7 with parts shown in section.

For the purpose of installing the wallboard a number of fasteners designated by the reference numeral 20 are used which are best shown in Figs. 2, 3, 17 and 18. In addition a number of staples 30 shown in Fig. 4 are used to secure the board to the studs at the joints. To prepare the board prior to erection a slitting tool 40 shown in Figs. 5 and 6 is employed while a joint grooving tool 50 shown in Figs. 7 and 8 is used to form the groove in the joint after the wallboard is erected. A similar tool 60 forms the groove at the corners of the room. This tool is shown in Fig. 9. In Fig. 10 is shown one of a number of spacers 70 which are used in the erection of a board. All of these various tools and devices will now be described in detail.

The fastener shown in Figs. 2, 3, 16 and 17 is constructed from a strip of sheet metal which is sheared along diagonal converging lines 24 and 25 to form two sets of prongs 26 and 27. The lines of shears 24 and 25 extend completely through the lateral edges of strip so that the prongs 26 and 27 are formed with sharp corners. By means of this construction the strip is formed with a base 28 and with arms 31 and 32 extending outwardly therefrom. The arms 31 and 32 are bent at an angle to the base 28 as shown in Fig. 17 and project outwardly from said base. The prongs 26 and 27 are preferably curved, as shown in Figs. 2 and 17 and project outwardly from the base. These prongs are so situated that the points 29 thereof are situated substantially opposite the corners 33 formed where the said prongs are bent away from the arms 31 and 32. Struck out of the arms 31 and 32 are tongues 34 and 35 which are bent relative to said arms so that said tongues lie substantially in a common plane. These tongues remain attached to the arms thru connecting portions 87. The holes 88 formed in the arms 31 and 32 by tongues 34 and 35 are preferably constructed a trifle larger than said tongues, so that the tongues may be readily bent back into the plane of the arms 31 and 32. The base 28 has a number of holes 36 in the same through which one or more nails may be inserted and driven into a stud for attaching the fastener 20 to the same.

The staple 30 is constructed from flat wire and is bent to provide two legs 37 and 38 and a connecting portion 39. The legs 37 and 38 are sheared on a bias to provide points 41 which readily enter the wood into which the staple is driven.

The tool 40 consists of a block of wood 42 which has a slit 43 in the same parallel with one of the surfaces 44 thereof and extending through the major portion of the same. In this slit is disposed a blade 45 which is constructed with a ground edge 46 and a pointed end 47. The blade 45 is obliquely disposed in the slit 43 and is held clamped in position by means of two bolts 48 and 49 which pass through the two parts 151 and 152 of the block 42 formed by the slit 43. The bolt 49 passes through the blade 45 and serves as a pivot for guiding the blade 45 for movement into and out of the slit 43. The bolt 48 is disposed outwardly beyond the end of the blade 46 and permits of such movement. In the upper portion of the block 42 is a set screw 51 which is centered with respect to the slit 43 and extends partly into the same. This set screw is adapted to engage the edge of the blade 45 and to urge the same outwardly beyond the lower edge 52 of the block 42. Overlying the surface 44 of block 42 is a gauge plate 53 which is constructed with an outwardly turned forward edge 54. This plate is held attached to the block 42 by means of the bolts 48 and 49 which pass directly through the same. The block 42 is rounded at its corners and serves as a handle by means of which the tool 40 may be manipulated.

The tool 50 is constructed similarly to the tool 40 and comprises two blocks 55 and 56, best shown in Figs. 7 and 8. The two blocks 55 and 56 are identical excepting that one is left handed and the other one is right handed and for this reason only the block 56 will be described in detail. Block 56 is constructed with a slit 57 similar to the slit 43 of block 42 which is adapted to receive a blade 58. Blade 58 is identical with blade 45. Blade 58 is held in position by means of two bolts 59 and 61 which extend jointly through the blocks 55 and 56 and which are provided with nuts 62 which hold the parts clamped together. A set screw 63 threaded into the block 56 and centered with respect to the slit 57 adjusts the position of the cutting edge 64 of the blade 58 with respect to the edge 65 of said block. Block 55 is similarly provided with a blade 66 which is parallel with blade 57. Between the two blocks 55 and 56 is disposed a guide plate 67. The two bolts 59 and 61 extend through this guide plate and hold the guide plate firmly clamped between the said blocks. The guide plate 67 has the lowermost portion 68 thereof extending below the surfaces 65 of the blocks 55 and 56 a distance less than the thickness of the board with which the tool is to be used. To hold the two blocks 55 and 56 properly spaced at their uppermost portions another bolt 69 is employed which extends jointly through both the blocks 55 and 56. A washer 71 encircles the said bolt and holds the portions of the blocks 55 and 56 through which the bolt extends properly spaced. This washer is the same thickness as the guide plate 67. The distance between the two blades 58 and 66 may be increased by inserting shim washers on the bolts 59, 61 and 69 and on either side of the washer 71 and plate 67.

The tool 60 shown in Fig. 9 consists of one of the parts of the tool 50 shown in Fig. 8. Instead of the bolts 59 and 61 which are used to hold the parts together two shorter bolts 101 are employed. These bolts are countersunk into the face 103 of the block 55 forming a part of said tool so that the said base is smooth throughout its extent.

One of the spacers 70 is shown in detail in Fig. 10. This spacer is constructed from sheet metal and is stamped to provide a body portion 72 elongated in form which is provided at one edge with 75 two outwardly projected prongs 73 and 74. At the ends of the body 72 are provided notches 79. The prongs 73 and 74 may be sharpened if desired so that the same readily drive into the studs of the building with which the spacer is to be used.

The manner of installing wallboard in accordance with the invention is as follows:

The walls of the room are erected one at a time. For the sake of illustration the wall 12 has been shown as erected first and the following description will refer to the wall 11. In the erection of this wall the same is divided into sections in accordance with the width of the wallboard used and the spacing of the studs. The studs are usually spaced sixteen inches and the wallboard comes four feet wide so that each section of wallboard spans three spaces between studs. Where an odd number of studs exist in the wall a smaller section of wallboard is used to fill up the remaining space. In Fig. 1 the wall 11 has been illustrated as comprising three sections of wallboard 75, 76 and 77. After the wall 12 is completed and the last section of wallboard 78 thereof adjacent the corner of the room installed the installation of wallboard on the wall 11 may be commenced.

To the studs 15, 17 and 18 are applied the fasteners 20 which are secured thereto by means of nails 79 as shown in Figs. 17 and 18. These nails are inserted through the holes 36 in the bases 28 of the fasteners 20 and are driven into place by means of a nail set or any similar tool. The fasteners 20 applied to the stud 15 are placed near the edge 81 of the stud 15 and are arranged vertically for a purpose to be subsequently described. The fasteners 20 on the studs 17 and 18 extend crosswise as shown in Figs. 17 and 18. Also fasteners 20 are applied to the plate 14 in the same manner as to the stud 15, being arranged longitudinally with respect to said stud and near the lowermost edge 82 thereof. Likewise fasteners may be secured to the floor plate of the room if desired or if a baseboard is to be applied over the wallboard the wallboard may be secured by nails instead of by fasteners.

Assume that sheet 76 is first to be erected. This sheet is first cut to length and placed upon a table or on saw horses. Slitting tool 40 is first used which is applied to all of the edges of the wallboard along which a joint is to be formed. In using tool 40 the gauge plate 53 thereof is caused to rest upon the outermost surface 89 of the wallboard and with the blade 45 near the exposed edge of the board. The tool is then run along the board and the blade forced into the edge of the board. The operation is repeated several times and each time blade 45 is forced further into the board until the surface 52 of the block 42 engages the edges of the board and terminates inward movement of the blade into the board. The depth of the cut may be regulated by adjustment of the set screw 51. The same operation is performed only on the vertical edges of the board. In Fig. 11 the left hand marginal portion of the section of wallboard 76 is shown and the slit formed therein is designated by the reference numeral 91. This slit may be arranged approximately midway between the inner and outer surfaces of the wallboard which dimension is determined by the position of the slit 43 in the block 42. This distance may be varied by the use of shim washers between the plate 53 and block 42.

After all of the fasteners 20 have been applied to the studs and plates, the sections of wallboard are erected. For the sake of convenience in explanation it will be assumed that the sheet 76 is first to be erected. Two or three of the spacers 70 are first secured to the stud 16 midway between the lateral edges thereof by driving the prongs 73 and 74 into the same. One of the spacers may be placed approximately one foot from the ceiling, another one foot from the floor and the third somewheres in between. The intermediate spacer may be omitted if desired. The spacers are properly applied when the prongs 73 and 74 become embedded in the stud and the edges 83 of said spacers rest upon the outwardly facing surface of the stud. The section 76 is next placed in proper position in front of the studs to which it is to be attached. The section is then raised by placing a block or wedge under the lowermost edge thereof and elevated until it reaches the ceiling joist 23 adjacent the plate 14. While so positioned the sheet 76 is moved laterally until it engages the bodies 72 of the spacers 70. The bodies of these spacers are of a height considerably greater than the thickness of the wallboard so that the same form stops for positioning the section 76 prior to the attachment of the sheets to the wall. If the section does not fit snugly against both the ceiling joists and spacers 70 it is readjusted until it fits against said spacers. In such case it may at one end form a gap between it and the ceiling joists.

After the section 76 is properly positioned with its edge bearing against the spacers 70 the sheet is attached to the studs 17 and 18 and the plate 14. The position of the wallboard with reference to the fasteners 20 prior to attachment is shown in Fig. 17. The prongs 26 and 27 in such position slightly enter the board and the tongues 34 and 35 bear against inner surface 84 of the board. Attachment is accomplished by placing a large block of wood such as a two foot length of studding upon the exterior of the wallboard directly in front of the facing surface of the stud to which the board is to be first attached. This block is given a smart blow with a hammer. When the block overlying the board is hit with the hammer the tongues 34 and 35 bend the arms 31 and 32 about the bends 85 and 86 and cause said arms to align with the base 28. The width of the base 28 at the bends 85 and 86 is relatively narrow so that said arms readily bend. Also the width of the connecting portions 87 between the tongues 34 and 35 and arms 31 and 32 are relatively narrow. This causes the tongues 34 and 35 to readily fold back into the planes of the arms 31 and 32. In the formation of the tongues 34 and 35 the holes 88 formed in said arms as previously described are constructed slightly larger than the tongues so that the tongues are readily received within the same and the said tongues, arms and base 28 all lie substantially in a common plane. The prongs 26 being bent from the arm 31 follows with said arm as the same is straightened out and likewise the prongs 27 follow with the arm 32 as said arm is straightened out. This causes the four prongs to hook into the wallboard as shown in Fig. 18 and to attach the wallboard to the fastener 20. It will readily become apparent that the prongs 26 and 27 are of such length that the same do not project through the outer surface 89 of the wallboard during the application of the wallboard to the fastener or after the wallboard has been applied. In this manner the wallboard is rigidly secured to the studs without means of support visible from the interior of the room. In applying the wallboard to the studs the block of wood is shifted around to the various fasteners and the fasteners straightened out gradually so as to prevent tearing of the board, which might occur if one of the fasteners was completely driven in before the other fasteners were partly in place. When all of the fasteners on the studs and plates are properly applied the next section of wallboard may be erected.

It will be assumed that section 75 is to be applied next. This section is cut to dimensions as closely as possible and is slit along both vertical edges the same as the sheet 76. The marginal portion of section 75 at the right hand portion of the section is shown in Fig. 11. The slit therein is designated by the reference numeral 92. In applying section 75 the same is butted up against the spacers 70 as shown in Fig. 11 and any irregularities between the edge of the section 76 and the wallboard 78 of wall 12 are allowed to occur at the surface of the wallboard 78. Thus a groove of uniform width, which is indicated at 93 in Fig. 13 is formed between the two sheets 75 and 76 when the spacers 70 are removed. After the section 75 is in position the same is attached through the fasteners 20 as previously described. After this section is in position the spacers 70 are removed by applying the claw of a claw-hammer to the notch 79 and pulling the end of said spacer outwardly. This causes the spacer to rock on the opposite heel 94 of the body portion 72 thereof and to cause the prongs 73 and 74 to become readily extracted.

A groove such as indicated at 95 in Figs. 12 and 13 is next formed in the adjoining portions of the sections 75 and 76 of the wallboard. This is accomplished by means of the tool 50. The protruding portion 68 of guide plate 67 is first inserted into the slot 93 formed between the two sections of wallboard 75 and 76. The tool 50 is then drawn along the said groove which serves as a guide for guiding the movement of the tool. At the same time the tool is pressed inwardly so that the blades 58 and 66 thereof enter the outermost portion of both sheets of wallboard through the outer surfaces 89 thereof. The operation may be repeated, the cutting being made in installments until the depth of the two cuts is equal to the distance of the slits 91 and 92 from the outer surface 89 of the wallboard. This removes the outermost corners of the board and leaves the groove 95. The groove 95 is thus of uniform width and depth.

After the groove 95 has been formed a number of staples 30 are driven through the remaining portions 96 and 97 of the sections of wallboard and into the studs 16. This securely attaches the marginal portions of the sections of wallboard to the stud. Thereafter strips of wallboard, indicated at 98, are glued or cemented into the groove 95. These strips are of a width slightly greater than the width of the groove and of a thickness substantially equal to the depth of the groove. By means of this construction a tight joint is provided which is of the same tightness throughout its extent. After the strip 98 has been properly applied the surface of the joint may be sanded down so that the outermost surface 89 of the wallboard is perfectly flat and smooth.

In a similar manner the section 77 is applied and the other sections of the wall installed. The ceiling 13 is similarly installed and the sections used in forming the same erected in the same manner and constructed with slits identical with those previously described in conjunction with the walls.

In forming the joints in the corners of the room the tool 60 is employed. Assume that the joint between walls 11 and 12 is to be formed. Prior to erection of the section 75 a slit 106 is first formed in the edge of said section as shown in Fig. 14. The surface 103 of tool 60 is run along the outwardly facing surface of the wallboard 78 forming wall 12 and the blade 66 of said tool caused to enter the section 75. This forms a groove 104 which is shown in Fig. 15. The said groove is of uniform width and depth and in this groove is inserted a filler strip 105 similar to the filler strip 98 used with the joint 106. This strip is glued or cemented in place which attaches the adjoining portions of the wallboard of the two walls 11 and 12 together, as shown in Fig. 16. Similar joints are formed between the ceiling 13 and the various walls and also between the other walls of the room.

It will readily be comprehended that after the wallboard has been installed in accordance with my invention, completely closed joints are formed throughout the entire extent of the room and no visible means of fastening are discernible. The wallboard after being installed as specified may be coated with a suitable primer and thereafter painted in the customary manner or, if desired, the same hung with wall paper.

The advantages of my invention are manifest. An extremely practical construction is provided and method employed whereby wallboard may be readily erected. With my invention the wallboard may be erected in a minimum length of time. Due to the type of fastener used there are no nail holes to putty up and no blemishes appear on the surface of the board. I have tested wallboard and find that joints constructed in accordance with my invention are practically as strong as the board itself and do not open up after installation of the board. Where a fiber board is used sufficient give is had in the board so that strains which might be set up are easily relieved without affecting the joints or the fastenings of the board. In this manner cracks in the surface of the wallboard are entirely prevented. With my invention it becomes unnecessary to wait for any length of time before applying the painting or paper since the glue used in the joints can be made to set in from four to twenty-four hours. With my invention an insulating board may be used whereby added advantages are procured. The tools used with my invention can be constructed at a nominal cost and the blades used in conjunction therewith can be readily removed for sharpening and replacement.

The wallboard fastener disclosed in Figures 2, 3, 17, and 18 is disclosed and claimed in my copending divisional application 189,799, filed Feb. 10, 1938 and tools disclosed in Figures 5, 6, 7, 8 and 9 disclosed and claimed in my copending application Serial No. 313,969 filed January 15, 1940, constituting a continuation in part of the instant application for patent.

Having described my invention, what I consider as new and desire to protect by Letters Patent is:

1. The method of installing two adjoining sections of wallboard which consists in forming slits in the sections intermediate their front and rear surfaces at the adjoining edges thereof and prior to erection of both sections, in erecting the sections with their adjoining edges spaced from one another to form a slot therebetween, in severing after erection the outer marginal portions of the sections formed by the slits, in controlling the severing through the agency of the slot to form a groove of uniform lateral dimensions extending into both of the sections and exposed from the outer surfaces of the sections and in securing in said groove and to said sections a preformed filler strip of dimensions corresponding to those of the groove.

2. The method of installing two adjoining sections of wallboard which consists in erecting the sections with their adjoining edges adjacent one another, in forming after erection a groove of uniform lateral dimensions partly in one section and partly in the other section, and in securing in said groove and to both of said sections a preformed filler strip of dimensions corresponding to those of the groove.

3. The method of installing two adjoining sections of wallboard one of which has a surface angularly disposed with reference to the outer surface of the other section, which consists in erecting the sections with the angularly disposed surface of the one section adjacent an edge of the other section, in making a cut into the second section transversely of and thru the outer surface thereof, in maintaining said cut equally spaced from the angularly disposed surface by utilizing said surface as a guide, in removing the marginal portion of the second section between the cut and the angularly disposed surface of the first section and in securing in between said cut and surface a filler strip.

4. The method of installing two adjoining sections of wallboard which consists in erecting the sections with their adjoining edges spaced from one another to form a slot therebetween, in forming a groove extending into both sections, in utilizing said slot as a guide in forming said groove and in securing in said groove a preformed filler strip.

5. A spacer for use in forming a slot between two sections of wallboard, said spacer comprising an elongated body of a thickness equal to the thickness of the slot, prongs issuing from one of the edges of the body for securing the spacer in position adjacent the edge of one of the sections of wallboard, and an extension on said body disposed outwardly of the outer surface of the wallboard and adapted to engage the adjoining section of wallboard for guiding the same into juxtaposition with respect to said first section.

6. The method of installing two adjoining sections of wallboard which consists in erecting the sections with their adjoining edges adjacent one another and opposite a support, in forming after erection a groove of uniform lateral dimensions partly in one section and partly in the other section, in driving fasteners thru the grooved portions of the sections and into the support, and in securing in said groove and to both of said sections a preformed filler strip of dimensions corresponding to those of the groove and adapted to conceal the fasteners.

7. A spacer for use in forming a slot between two sections of wallboard, said spacer comprising an elongated body of a thickness equal to the thickness of the slot, prongs issuing from one of the edges of the body for securing the spacer in position adjacent the edge of one of the sections of wallboard, and an extension on said body disposed outwardly of the outer surface of the wallboard and notches formed in said extensions and providing shoulders engageable by the claw of a claw hammer for the purpose of extracting the spacer.

8. A spacer for use in forming a slot between two sections of wallboard, said spacer comprising an elongated body of a thickness equal to the thickness of the slot, prongs issuing from one of the edges of the body for securing the spacer in position adjacent the edge of one of the sections of wallboard, and an extension on said body disposed outwardly of the outer surface of the wallboard and extracting means on said extension.

9. In combination with an elongated support two sections of wallboard having juxtaposed edges, said edges overlying the support, said sections having a groove formed partly in one section and partly in the other and extending along said edges, said grooves extending partly thru the sections to leave remaining portions, fasteners extending thru the remaining portions and into the support, and a filler strip received within said groove and concealing said fasteners and the adjoining edges of said sections.

ALEXANDER S. T. LAGAARD.